(12) United States Patent
Klein et al.

(10) Patent No.: US 8,847,911 B2
(45) Date of Patent: Sep. 30, 2014

(54) CIRCUIT TO PROVIDE SIGNAL TO SENSE ARRAY

(75) Inventors: Hans W. Klein, Pleasanton, CA (US);
Kevin Gallagher, Whiterock, Midleton (IE); Daniel O'Keeffe, Whitechurch (IE); Denis Ellis, Patrickswell (IE); Bruce Byrkett, Preston, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 272 days.

(21) Appl. No.: 13/277,654

(22) Filed: Oct. 20, 2011

(65) Prior Publication Data
US 2012/0256870 A1 Oct. 11, 2012

Related U.S. Application Data

(60) Provisional application No. 61/472,152, filed on Apr. 5, 2011.

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0416* (2013.01)
USPC ............ 345/174; 345/173; 327/157; 327/536

(58) Field of Classification Search
CPC ...... G05B 13/02; G05B 3/0416; G05B 3/044; H02M 3/156; H02M 3/07; H02M 3/073; H02M 2001/007; H02M 2001/008; H02M 3/157; G11C 16/12; G11C 5/145; G11C 7/1072; G11C 7/222; G11C 11/4094
USPC ................... 345/173–184; 327/148, 157, 536
See application file for complete search history.

(56) References Cited

U.S. PATENT DOCUMENTS 5,767,735 A 6/1998 Javanifard et al.
5,781,473 A 7/1998 Javanifard et al.

(Continued)

OTHER PUBLICATIONS

Feng, Su; Component-Efficient Multiphase Switched-Capacitor DC-DC Converter with Configurable Conversion Ratios for LCD Deiver Applications; IEEE Xplore; http://ieeexplore.ieee.org/xpl/articleDetails.jsp?tp=&arnumber=4569877&contentType=Journals+%26+Magazines&queryText%3D10.1109%2FTCSII.2008.922467; 1 Page.
International Search Report for International Application No. PCT/US 11/65587 mailed Apr. 19, 2012; 2 pages.
Leung, Ka Nang et al.; A Gain Optimising Regulated Charge Pump; Ingentaconnect; International Journal of Electronics; vol. 98, No. 2, Feb. 2011; http://www.ingentaconnect.com/content/tandf/tetn/2011/00000098/00000002/art00005; 1 Page.
Palumbo, Gaetano et al.; Charge Pump Circuits: An Overview on Design Strategies and Topologies; IEEE Circuits and Systems Magazine; First Quarter 2010; pp. 32-51.

(Continued)

*Primary Examiner* — Amare Mengistu
*Assistant Examiner* — Gloryvid Figueroa-Gibson
(74) *Attorney, Agent, or Firm* — Lowenstein Sandler LLP

(57) ABSTRACT

A circuit for generating a voltage is disclosed. The voltage has an amplitude greater than an available power supply. The circuit includes a driver to supply the voltage on an output terminal to an electrode of a touch sense array. The circuit also includes a charge pump array coupled to the driver. The charge pump array includes an array of charge pumps to supply an input voltage to the driver. The circuit also includes a feedback circuit coupled to the charge pump array. The feedback circuit is configured to measure the input voltage and to select different combinations of the array of charge pumps to maintain the voltage on the output terminal.

14 Claims, 13 Drawing Sheets

(56) References Cited

U.S. PATENT DOCUMENTS

| | | | |
|---|---|---|---|
| 5,969,961 | A | 10/1999 | Yero |
| 6,064,250 | A | 5/2000 | Proebsting |
| 6,140,630 | A | 10/2000 | Rhodes |
| 6,151,229 | A | 11/2000 | Taub et al. |
| 6,310,789 | B1 | 10/2001 | Nebrigic et al. |
| 6,369,642 | B1 | 4/2002 | Zeng |
| 6,472,926 | B2 | 10/2002 | Taito et al. |
| 6,794,927 | B2 * | 9/2004 | Bedarida et al. ............. 327/536 |
| 7,511,564 | B2 | 3/2009 | Tahata |
| 7,626,444 | B2 | 12/2009 | Clewett et al. |
| 7,696,812 | B2 | 4/2010 | Al-Shamma et al. |
| 7,969,235 | B2 | 6/2011 | Pan |
| 8,072,256 | B2 | 12/2011 | Pyeon |
| 8,514,628 | B2 | 8/2013 | Nguyen et al. |
| 8,526,260 | B2 | 9/2013 | Pyeon |
| 2003/0016849 | A1 | 1/2003 | Andrade |
| 2006/0250177 | A1 * | 11/2006 | Thorp et al. ................. 327/536 |
| 2010/0117612 | A1 | 5/2010 | Klootwijk et al. |
| 2010/0194695 | A1 | 8/2010 | Hotelling et al. |
| 2010/0244858 | A1 | 9/2010 | Cormier, Jr. |
| 2011/0018851 | A1 * | 1/2011 | Huang et al. ................. 345/211 |
| 2011/0025629 | A1 * | 2/2011 | Grivna et al. ................ 345/173 |
| 2011/0133820 | A1 | 6/2011 | Pan |
| 2011/0278952 | A1 | 11/2011 | Reimann et al. |
| 2012/0182251 | A1 * | 7/2012 | Krah ............................. 345/174 |
| 2012/0249223 | A1 * | 10/2012 | Neugebauer ................. 327/536 |
| 2013/0076648 | A1 | 3/2013 | Krah et al. |

OTHER PUBLICATIONS

Starzyk, J.A.; A DC-DC Charge Pump Design Based on Voltage Doublers; Mar. 2001; IEEE Xplore; http://ieeexploreieee.org/xpl/articleDetails.jsp?tp=&arnumber=915390; 1 Page.

USPTO Final Rejection for U.S. Appl. No. 13/776,244 dated Jun. 2, 2014; 16 pages.

USPTO Non-Final Rejection for U.S. Appl. No. 13/776,244 dated Mar. 26, 2014; 14 pages.

USPTO Non-Final Rejection for U.S. Appl. No. 13/776,244 dated Nov. 26, 2013; 12 pages.

Wang, Chi-Chang; Efficiency Improvement in Charge Pump Circuits; Jun. 1997; IEEE Xplore; http://ieeexplore.ieee.org/xpl/articleDetails.jsp?tp=&arnumber=585287; 1 Page.

Woo, Jong-Kwan et al.; A Fast-Locking CDR Circuit with and Autonomously Reconfigurable Charge Pump and Loop Filter; Nov. 13-15, 2006; IEEE Xplore; http://ieeexplore.ieee.org/xpl/articleDetails.jsp?tp=&arnumber=4197677; 1 Page.

Written Opinion of the International Searching Authority for International Application No. PCT/US 11/65587 mailed Apr. 19, 2012; 4 pages.

Zhang, Xiwen; An Efficiency-enhanced auto reconfigurable 2x/3x SC charge pump for thanscutaneous power transmission; Sep. 13-16, 2009; IEEE Xplore; http://ieeexplore.ieee.org/xpl/articleDetails.jsp?tp=&arnumber=5556412; 1 Page.

* cited by examiner

| decimal | binary | | | | thermometer code | | | | | | | | | | | | | | | |
|---|---|---|---|---|---|---|---|---|---|---|---|---|---|---|---|---|---|---|---|---|
| | b3 | b2 | b1 | b0 | d15 | d14 | d13 | d12 | d11 | d10 | d9 | d8 | d7 | d6 | d5 | d4 | d3 | d2 | d1 |
| 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 | 0 | 0 | 0 | 0 | 0 | 0 | 1 |
| 2 | 0 | 0 | 1 | 0 | 0 | 0 | 0 | 0 | 0 | 0 | 0 | 0 | 0 | 0 | 0 | 0 | 0 | 1 | 1 |
| 3 | 0 | 0 | 1 | 1 | 0 | 0 | 0 | 0 | 0 | 0 | 0 | 0 | 0 | 0 | 0 | 0 | 1 | 1 | 1 |
| 4 | 0 | 1 | 0 | 0 | 0 | 0 | 0 | 0 | 0 | 0 | 0 | 0 | 0 | 0 | 0 | 1 | 1 | 1 | 1 |
| 5 | 0 | 1 | 0 | 1 | 0 | 0 | 0 | 0 | 0 | 0 | 0 | 0 | 0 | 0 | 1 | 1 | 1 | 1 | 1 |
| 6 | 0 | 1 | 1 | 0 | 0 | 0 | 0 | 0 | 0 | 0 | 0 | 0 | 0 | 1 | 1 | 1 | 1 | 1 | 1 |
| 7 | 0 | 1 | 1 | 1 | 0 | 0 | 0 | 0 | 0 | 0 | 0 | 0 | 1 | 1 | 1 | 1 | 1 | 1 | 1 |
| 8 | 1 | 0 | 0 | 0 | 0 | 0 | 0 | 0 | 0 | 0 | 0 | 1 | 1 | 1 | 1 | 1 | 1 | 1 | 1 |
| 9 | 1 | 0 | 0 | 1 | 0 | 0 | 0 | 0 | 0 | 0 | 1 | 1 | 1 | 1 | 1 | 1 | 1 | 1 | 1 |
| 10 | 1 | 0 | 1 | 0 | 0 | 0 | 0 | 0 | 0 | 1 | 1 | 1 | 1 | 1 | 1 | 1 | 1 | 1 | 1 |
| 11 | 1 | 0 | 1 | 1 | 0 | 0 | 0 | 0 | 1 | 1 | 1 | 1 | 1 | 1 | 1 | 1 | 1 | 1 | 1 |
| 12 | 1 | 1 | 0 | 0 | 0 | 0 | 0 | 1 | 1 | 1 | 1 | 1 | 1 | 1 | 1 | 1 | 1 | 1 | 1 |
| 13 | 1 | 1 | 0 | 1 | 0 | 0 | 1 | 1 | 1 | 1 | 1 | 1 | 1 | 1 | 1 | 1 | 1 | 1 | 1 |
| 14 | 1 | 1 | 1 | 0 | 0 | 1 | 1 | 1 | 1 | 1 | 1 | 1 | 1 | 1 | 1 | 1 | 1 | 1 | 1 |
| 15 | 1 | 1 | 1 | 1 | 1 | 1 | 1 | 1 | 1 | 1 | 1 | 1 | 1 | 1 | 1 | 1 | 1 | 1 | 1 |

FIGURE 8

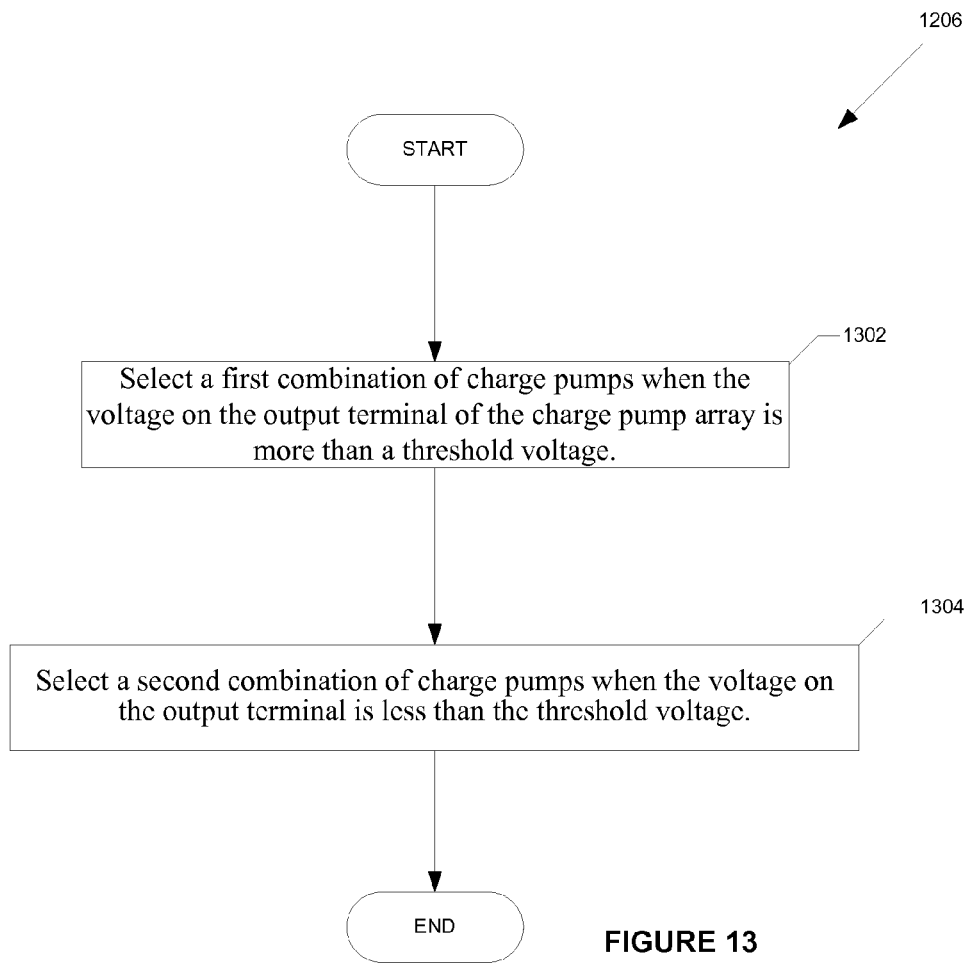

CIRCUIT TO PROVIDE SIGNAL TO SENSE ARRAY

RELATED APPLICATIONS

This application claims the benefit of U.S. Provisional Patent Application No. 61/472,152 filed Apr. 5, 2011, the disclosure of which is incorporated herein by reference in its entirety.

TECHNICAL FIELD

The present invention relates generally to capacitive touch sense arrays, and more particularly, to a circuit for generating a programmable supply voltage having an amplitude greater than an available power supply voltage and configured to drive a capacitive touch sense arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

A certain class of touch sense arrays includes a first set of linear electrodes separated and a second set of electrodes arranged at right angles and separated by a dielectric layer. The resulting intersections form a two-dimensional array of capacitors, referred to as sense elements. Touch sense arrays can be scanned in several ways, one of which (mutual-capacitance sensing) permits individual capacitive elements to be measured. Another method (self-capacitance sensing) can measure an entire sensor strip, or even an entire sensor array, with less information about a specific location, but performed with a single read operation.

The two-dimensional array of capacitors, when placed in close proximity, provides a means for sensing touch. A conductive object, such as a finger or a stylus, coming in close proximity to the touch sense array causes changes in the total capacitances of the sense elements in proximity to the conductive object. These changes in capacitance can be measured to produce a "two-dimensional map" that indicates where the touch on the array has occurred.

One way to measure such capacitance changes is to form a circuit comprising a signal driver (e.g., an AC current or a voltage source (transmit or "TX signal")) which is applied to each horizontally aligned conductor in a multiplexed fashion. The charge accumulated on each of the capacitive intersections are sensed and similarly scanned at each of the vertically aligned electrodes in synchronization with the applied current/voltage source. This charge is then measured, typically with a form of charge-to-voltage converter (i.e., receive or "RX signal"), which is sampled-and-held for an A/D converter to convert to digital form for input to a processor. The processor, in turn, renders the capacitive map and determines the location of a touch.

Conventional capacitive sensing driving circuits suffer from a number of deficiencies. The driving or "TX signal" is frequently a square wave operated from an integrated circuit's (IC's) supply voltage, e.g., 2.5V. Unfortunately, the magnitude of the resulting TX signals for measuring a capacitance change between electrodes of the touch sense array may be on the order of a few percent. Since TX signal circuits are often noisy, it becomes difficult to distinguish a measured signal due to the TX signal component from a noise signal component. As a result, such measurements have a low signal-to-noise (SNR) ratio.

If a larger TX signal is used, the sensitivity of the sensing circuit increases proportionally (since system and environmental noise stays the same). Thus, the signal-to-noise ratio (SNR) can be improved by raising the TX voltage. Producing a TX voltage higher than the supply voltage of an IC requires a boosting circuit. A conventional method to achieve that boost is to employ a charge pump. A charge pump uses multiple stages to raise the voltage across a capacitor above the supply voltage. More stages result in a higher TX voltage. The last stage of the charge pump then produces a final voltage and stores it in a "tank" or "reservoir" capacitor. A load can then be connected to that capacitor.

In a touch application, the resulting RX signal typically includes a large amount of ripple noise due to the pumping action of the stages in the charge pump, which operate in the MHz frequency range. To reduce noise from ripple and other sources, the final "tank" or "reservoir" capacitor is fairly large: on the order of a few nF or more. Such a capacitor generally cannot be implemented on-chip and is therefore cost-prohibitive.

BRIEF DESCRIPTION OF THE DRAWINGS

Embodiments of the present invention will be more readily understood from the detailed description of exemplary embodiments presented below considered in conjunction with the attached drawings in which like reference numerals refer to similar elements and in which:

FIG. 8 is a table of thermometer codes implemented by a thermometer decoder FIG. 4.

FIG. 13 is a flow diagram illustrating one embodiment of selecting different combinations of the charge pumps of FIG. 12.

DETAILED DESCRIPTION

Figure 1:
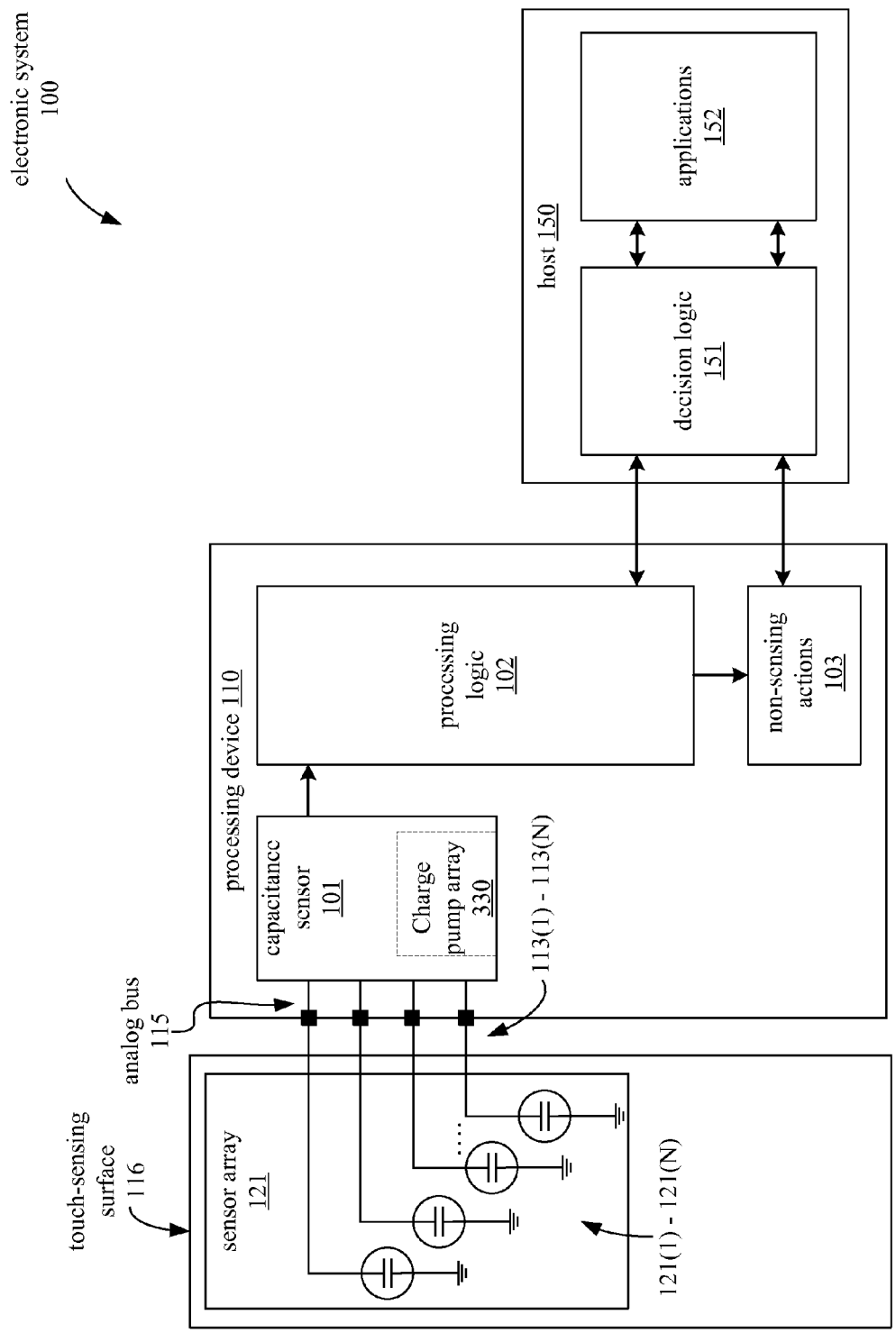
FIG. 1 illustrates a block diagram of one embodiment of an electronic system including a processing device that may be configured to measure capacitances from a flexible touch-sensing surface and calculate or detect the amount of force applied to the flexible touch-sensing surface.

Embodiments of the invention provide a circuit for generating a target voltage having an amplitude greater than an available power supply and configured to drive a capacitive a touch sense array. In one embodiment, the circuit includes a driver to supply the target voltage on an output terminal to an electrode of the touch sense array. The circuit also includes a charge pump array coupled to the driver. The charge pump array includes an array of charge pumps to supply an input voltage to the driver. The circuit also includes a feedback circuit coupled to the charge pump array. The feedback circuit is configured to measure the input voltage and to select different combinations of the array of charge pumps to maintain the target voltage on the output terminal.

In one embodiment, the first feedback circuit selects a first combination of the charge pumps when the input voltage is more than a threshold level and selects a second combination of charge pumps when the input voltage is less than the threshold voltage. In one embodiment, the second combination includes fewer charge pumps than the first combination. The input voltage is programmable.

In one embodiment, the first feedback circuit includes a first feedback scaler circuit coupled to the charge pump array and configured to produce a first voltage proportional to the input voltage. The first feedback circuit further includes a comparator coupled to the feedback scaler circuit. A reference generator produces a reference voltage coupled to the comparator. The reference generator is configured to select the input voltage.

In one embodiment, the circuit may also include a second feedback circuit coupled to the charge pump array and configured to provide a reference voltage to the charge pump array.

The embodiments described herein provide for several improvements over conventional charge pump designs. By increasing the TX voltage above a supply signal, SNR is improved. The embodiments described herein also decrease power consumption and SNR in several other ways. A clock ripple reduction scheme is applied in order to reduce clock energy within a single pumping cycle. Small time delays are introduced between firing multiple stages of each sub-charge pump of the charge pump array to "spread" current transitions of clocked circuits across a slightly broader time window. This avoids large instantaneous energy spikes, and serves to reduce EMI (i.e., high-frequency coupling onto other components in the system, such as an RF radio). Furthermore, the comparator provides a "threshold" signal which a logic circuit interprets to alter the pump strength (once the output has settled). This serves to reduce output ripple introduced to the touch sense array. In a related embodiment, the input voltage may be applied to a programmable current driver that provides a TX signal that does not have very sharp edges (low dV/dt). This reduces current spikes when these edges are applied to a capacitive load, such as the touch sense array.

FIG. 1 illustrates a block diagram of one embodiment of an electronic system 100 including a processing device 110 that may be configured to measure capacitances from a flexible touch-sensing surface and calculate or detect the amount of force applied to the flexible touch-sensing surface. The electronic system 100 includes a touch-sensing surface 116 (e.g., a touch screen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. In another embodiment, the capacitance sensor 101 includes a charge pump array 330 to be described below.

It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
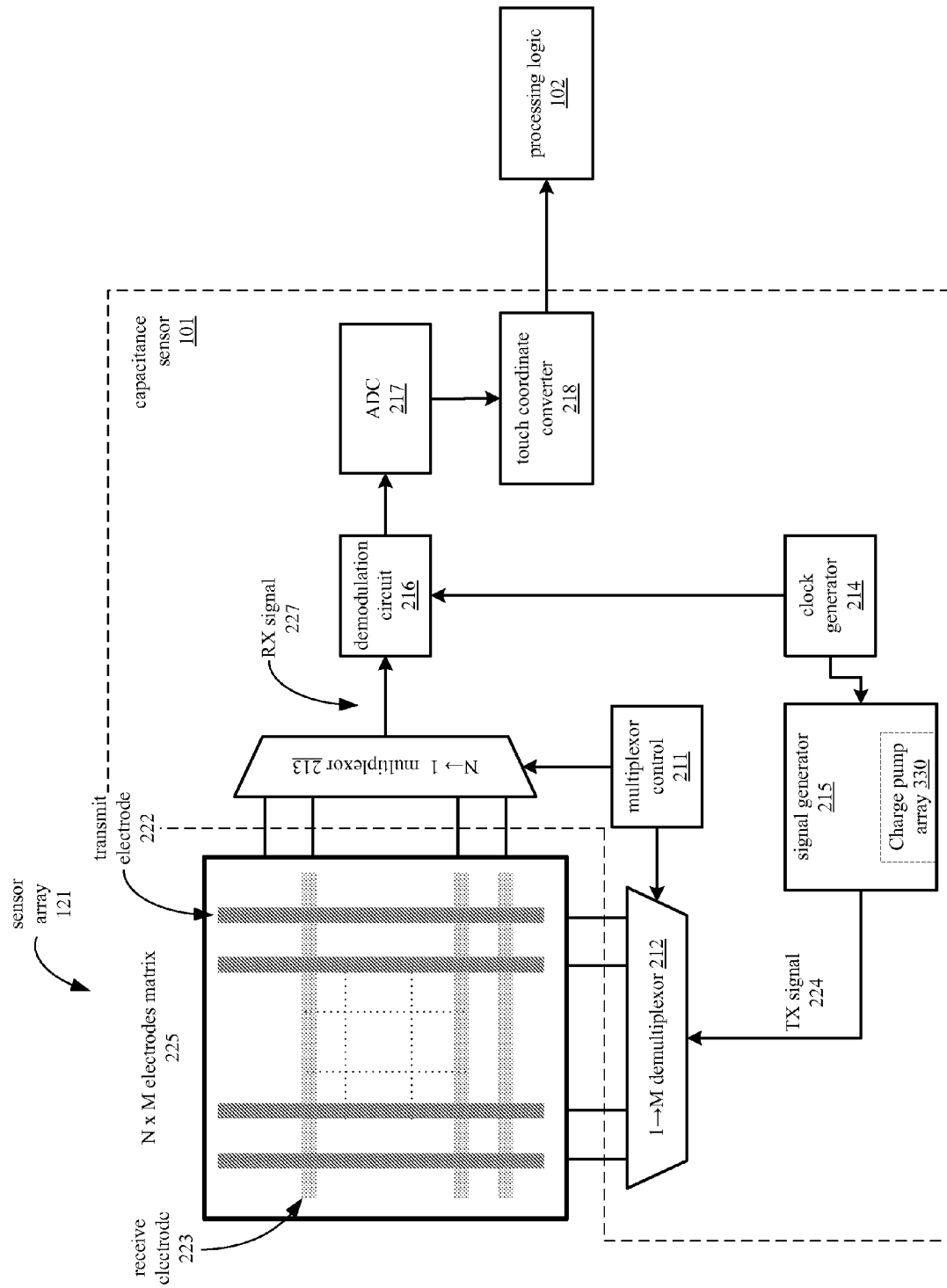
FIG. 2 is a block diagram illustrating one embodiment of a capacitive touch sensor array and a capacitance sensor that converts measured capacitances to coordinates.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensor 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

In one embodiment, processing logic 102 may be a processing core 102. The processing core may reside on a common carrier substrate such as, for example, an integrated circuit ("IC") die substrate, a multi-chip module substrate, or the like. Alternatively, the components of processing core 102 may be one or more separate integrated circuits and/or discrete components. In one exemplary embodiment, processing core 102 is configured to provide intelligent control for the Programmable System on a Chip ("PSoC®") processing device, manufactured by Cypress Semiconductor Corporation, San Jose, Calif. Alternatively, processing core 102 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like. In one embodiment, the processing core 102 and the other components of the processing device 110 are integrated into the same integrated circuit.

It should also be noted that the embodiments described herein are not limited to having a configuration of a processing core 102 coupled to a host 150, but may include a system that measures the capacitance on the touch sense array 121 and sends the raw data to a host computer where it is analyzed by an application. In effect, the processing that is done by processing core 102 may also be done in the host. The host may be a microprocessor, for example, as well as other types of processing devices as would be appreciated by one of ordinary skill in the art having the benefit of this disclosure.

The components of the electronic system 100 excluding the touch sense array 121 may be integrated into the IC of the processing core 102, or alternatively, in a separate IC. Alternatively, descriptions of the electronic system 100 may be generated and compiled for incorporation into other integrated circuits. For example, behavioral level code describing the electronic system 100, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the electronic system 100.

It should be noted that the components of the electronic system 100 may include all the components described above. Alternatively, the electronic system 100 may include only some of the components described above.

In one embodiment, the electronic system 100 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sense array 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different. In another embodiment, the signal generator 215 includes a charge pump array 330 to be described below.

The output of signal generator 215 is connected with demultiplexer 212, which allows the TX signal 224 to be applied to any of the M transmit electrodes of touch sense array 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, a system for tracking locations of contacts on a touch-sensing surface may determine a force magnitude for each of the contacts based on the capacitance measurements from the capacitive sensor array. In one embodiment, a capacitive touch-sensing system that is also capable of determining a magnitude of force applied to each of a plurality of contacts at a touch-sensing surface may be constructed from flexible materials, such as PMMA, and may have no shield between the capacitive sensor array and an LCD display panel. In such an embodiment, changes in capacitances of sensor elements may be caused by the displacement of the sensor elements closer to a VCOM plane of the LCD display panel.

Figure 3:
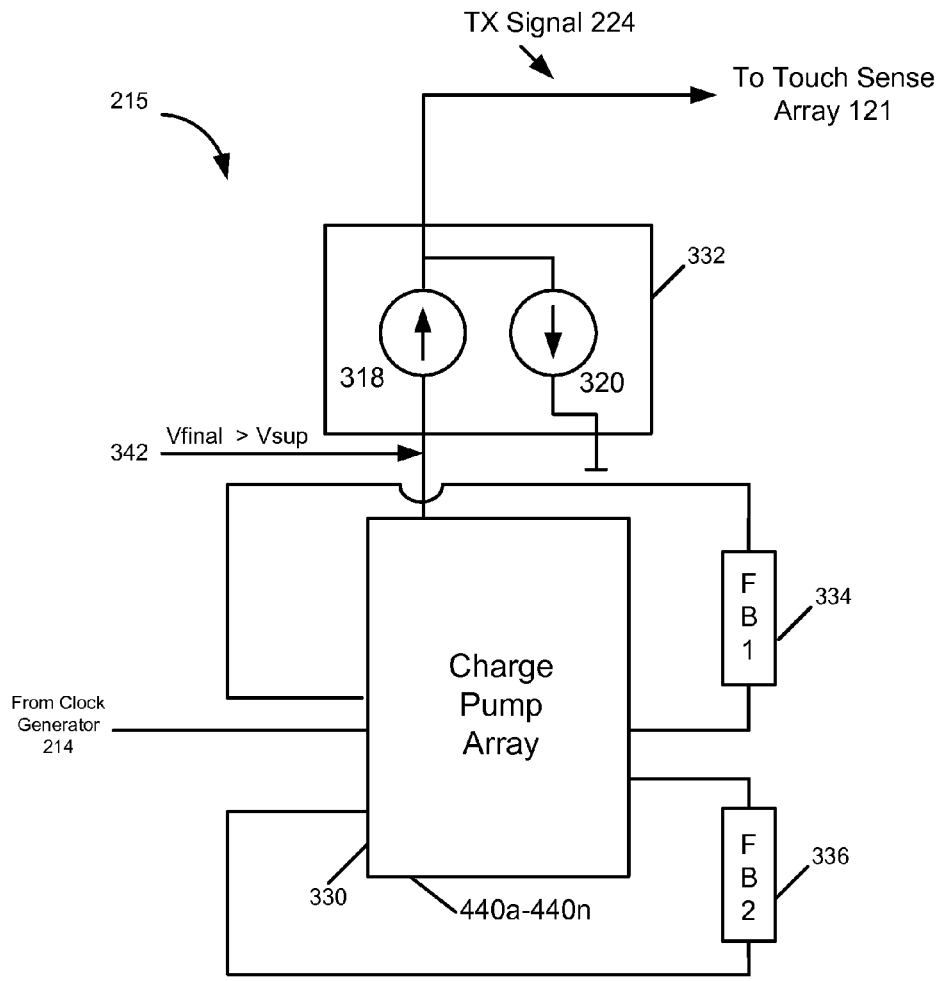
FIG. 3 depicts an electrical block diagram of one embodiment of the signal generator configured to produce a TX signal to be supplied to the transmit electrodes of the touch sense array of FIG. 2.

FIG. 3 depicts an electrical block diagram of one embodiment of the signal generator 215 configured to produce the TX signal 224 to be supplied to the transmit electrodes of the touch sense array 121 of FIG. 2. In an embodiment, the input TX signal 224 may be any periodic signal having a positive portion and a negative portion, including, for example, a sine wave, a square wave, a triangle wave, etc. as would be appreciated by one of ordinary skill in the art having the benefit of this disclosure.

Returning again to FIG. 3, the signal generator 215 includes a charge pump array 330 of charge pumps 440a-440n. The charge pump array 330 is configured to supply a target voltage (e.g., 10 V) that is greater than a supply voltage (e.g., 2.5 V) used to supply all of the circuits of the electronic system 100 except for the touch sense array 121. The touch sense array 121 may be driven by and coupled to a high voltage programmable current driver 332 which may be, for example, a combination of current sources and current sinks 318, 320. The compliance voltage of the programmable current driver 332 may be configured to have a maximum value corresponding to the target voltage.

In one embodiment, the charge pump array 330 is coupled to a first feedback circuit 334 configured to measure a voltage on an output terminal 442 of the charge pump array 330 to select different combinations of charge pumps 440a-440n to regulate power (i.e., to maintain the target or compliance voltage of the programmable current driver 332). In another embodiment, the charge pump array 330 is further coupled to a second feedback circuit 336 configured to provide accurate regulation of the voltage on the output terminal 442 of the charge pump array 330. The charge pump array 330 may be supplied with a clock signal from the clock generator 214 of FIG. 2.

Figure 4:
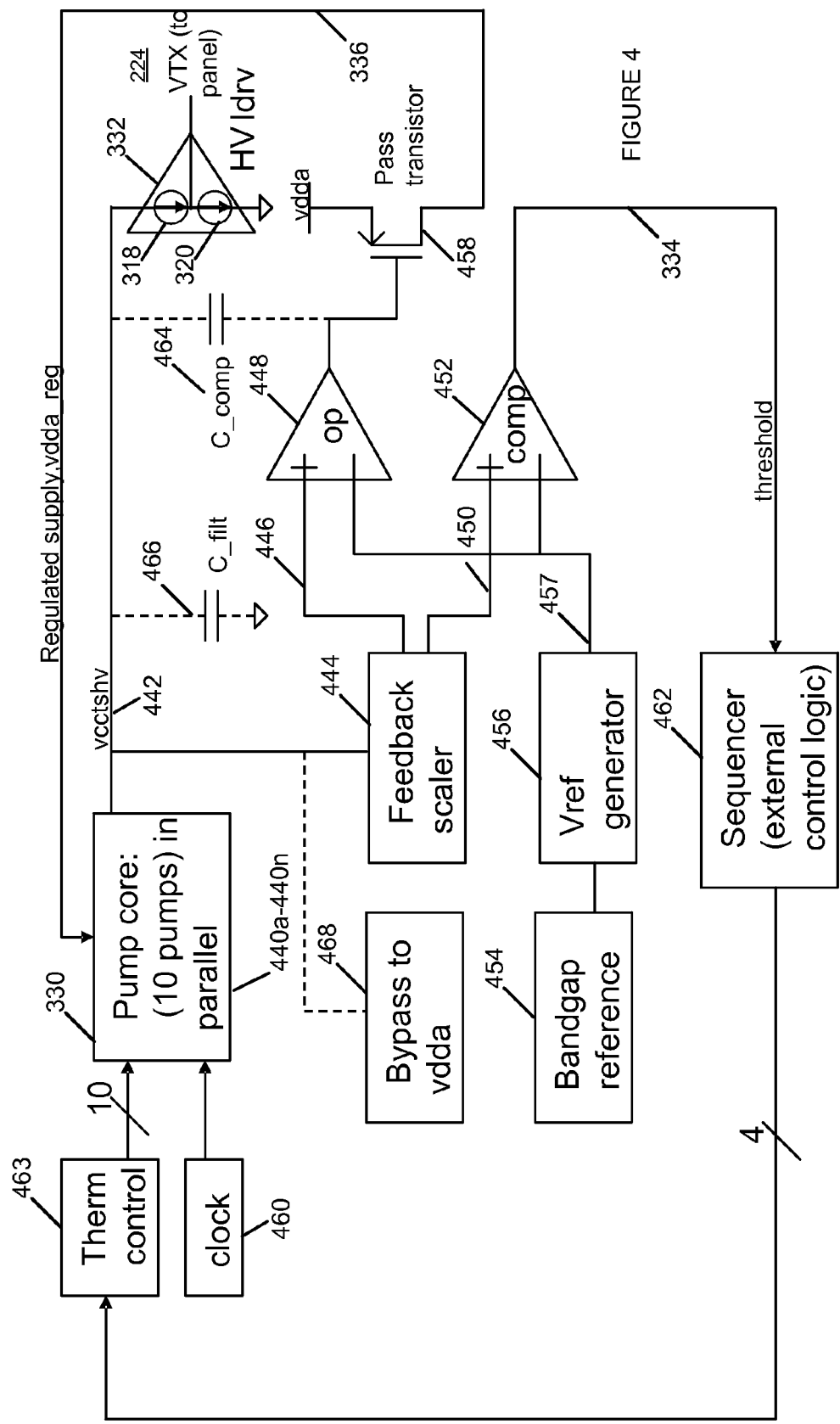
FIG. 4 is a block diagram of one embodiment of the components of the charge pump array, the programmable current driver, the first feedback circuit, and the second feedback circuit, employed in the electronic system of FIG. 1.

FIG. 4 is a block diagram of one embodiment of the components of the charge pump array 330, the programmable current driver 332, the first feedback circuit 334, and the second feedback circuit 336, employed in the electronic system 100 of FIG. 1. The charge pump array 330 may include a programmable combination of charge pumps 440a-440n (e.g., 10 charge pumps) connected in parallel. The voltage on the output terminal 442 of the charge pump array 330 may be a regulated DC level (e.g., 10 V). The output terminal 442 of the charge pump array 330 may be coupled to a feedback scaler circuit 444 configured to produce a first voltage on an output terminal proportional to the voltage on the output terminal 442 of the charge pump array 330. In one embodiment, the feedback scaler circuit 444 may be a resistive voltage scaler circuit with a scaling factor of approximately 0.1. Alternatively, other scaling factors may be used as would be appreciated by one of ordinary skill in the art having the benefit of this disclosure. The feedback scaler circuit 444 may have two output terminals: one output terminal 446 coupled to an operational amplifier (op-amp) 448 associated with the second feedback circuit 336 and a second output terminal 450 coupled to a comparator 452 associated with the first feedback circuit 334. The voltage impressed on the comparator 452 from the second output terminal 450 may be slightly greater (e.g., about 15 mV) than that impressed on the op-amp 448.

A bandgap reference circuit 454 provides a reference voltage close to the supply voltage that is stable over temperature, time, and current draw. The bandgap reference circuit 454 is coupled to a reference generator circuit 456 that has an output terminal 457 coupled to both the comparator 452 and the op-amp 448. The output voltage of the reference generator circuit 456 is programmable and derived from the reference voltage. This permits the voltage on the output terminal 442 of the charge pump array 330 to be set to values in the range of 3 V-10 V. Alternatively, other output voltages may be used as would be appreciated by one of ordinary skill in the art having the benefit of this disclosure.

The second feedback circuit 336 is configured to provide a steady state value for the voltage on the output terminal 442 of the charge pump array 330 (e.g., 10 V). The op-amp 448 controls a gate terminal of a pass transistor 458. The source terminal of the pass transistor is connected to the supply voltage (e.g., 2.5 V), while the drain terminal of the pass transistor 458 outputs a voltage, vdda_reg, that provides a supply for a final stage of a clock driver 460 for the charge pump array 330. The charge pump array 330, the feedback scaler circuit 444, the op-amp 448, and the pass transistor 458 form a closed loop control system (i.e., the second feedback circuit 336) that accurately regulates the target voltage on the output terminal 442 (e.g. 10V), which, in one embodiment, is itself programmable (e.g., in a range of about 3V to 10V). In a steady state (i.e., when the voltage on the output terminal 442 has settled), vdda_reg "sits" at just the right level to sustain the voltage on the output terminal 442 of the charge pump array 330. (e.g., 10V).

Figure 5:
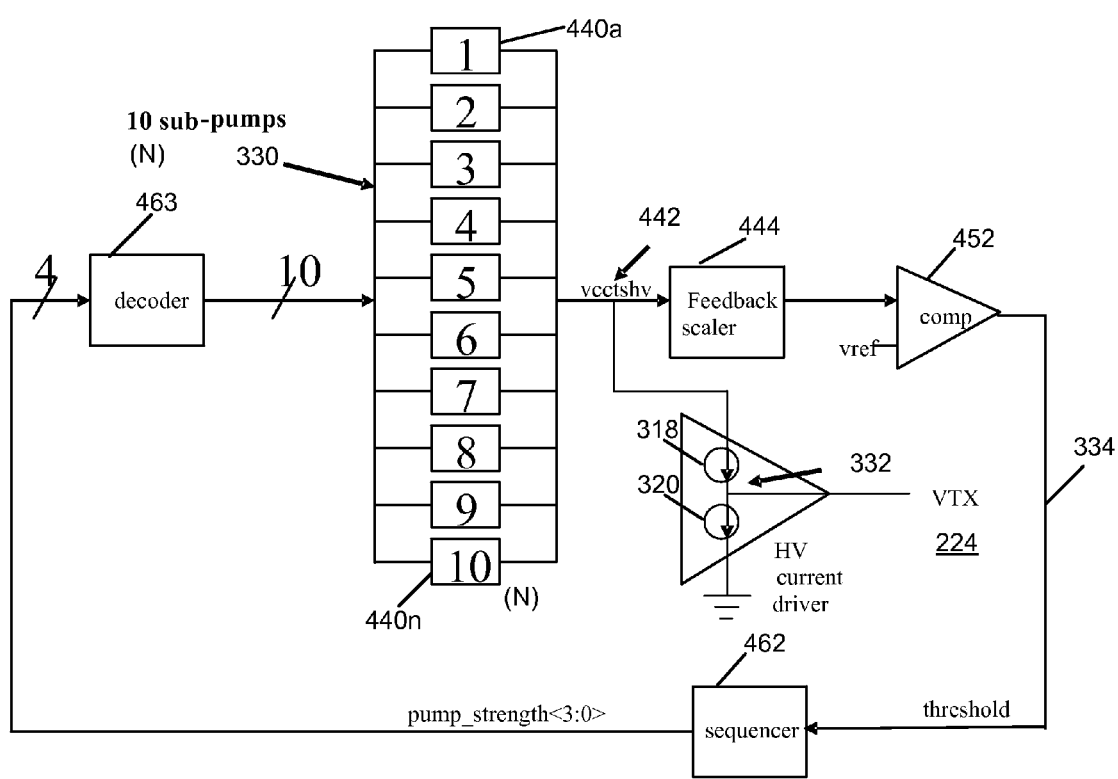
FIG. 5 is a block diagram of one embodiment of the components of the charge pump array, the programmable current driver, and the first feedback circuit of FIG. 4 that illustrates the operation of the charge pumps of the charge pump array.

FIG. 5 is a block diagram of one embodiment of the components of the charge pump array 330, the programmable current driver 332 and the first feedback circuit 334 of FIG. 4 that illustrates the operation of the charge pumps 440a-440n of the charge pump array 330. Referring now to FIGS. 4 and 5, in the first feedback circuit 334, the comparator 452 provides a means for controlling output power (i.e., the voltage on the output terminal 442 of the charge pump array 330).

When the voltage on the output terminal 442 reaches approximately 98% of the programmed level (e.g., 9.8V for a 10V target voltage), the comparator 452 switches state to provide a trigger or "threshold" signal to a sequencer 462 (i.e., external control logic). Since the voltage on the output terminal 442 of the charge pump array 330 has nearly settled, it is no longer necessary to drive all of the charge pumps 440a-440n. Perhaps one or two charge pumps (e.g., 440a and 440b) are sufficient. Operating on fewer charge pumps reduces power consumption and may improve SNR by reducing output ripple emanating from the charge pump array 330.

As a result, the first feedback circuit 334 is configured to select different combinations of the charge pumps 440a-440n to maintain the voltage on the output terminal 442 of the charge pump array 330 to provide adequate power to the programmable current driver 332. In one embodiment, the first feedback circuit 334 is configured to select a first combination of the charge pumps 440a-440n (e.g., 10) when the voltage on the output terminal 442 of the charge pump array 330 when the input voltage is more than a threshold level and configured to select a second combination of the charge pumps 440a-440n (e.g., 2) when the voltage on the output terminal 442 of the charge pump array 330 is less than the threshold voltage. In one embodiment, the second combination may have fewer charge pumps than the first combination.

In another embodiment, the feedback circuit may measure and send a voltage proportional to the voltage on the output terminal 442 of the charge pump array 330 to the processing core 102, and the processing core 102 may select (using or without using the first feedback circuit 334) the combinations.

More particularly, the sequencer 462 is a large digital control block serving many functions. The sequencer 462 has full control over all switches and activities in general in an entire touch-screen subsystem (TSS). Using the sequencer 462, all activities in an RX and TX circuits occur in a fully synchronous fashion. The sequencer circuit 462 is implemented as part of the PSoC® processing device comprised of custom universal digital blocks (UDB). As used herein, UDBs are a collection of uncommitted logic (PLD) and structural logic (Datapath) optimized to create all common embedded peripherals and customized functionality that are application or design specific. UDBs may be employed to implement a variety of general and specific digital logic devices including, but not limited to, field programmable gate arrays (FPGA), programmable array logic (PAL), complex programmable logic devices (CPLD) etc.

Only a small portion of the sequencer 462 is employed in the first feedback circuit 334. To select between, for example, two combinations of charge pumps 440a-440n, the sequencer 462 is configured to select between a "ramp" setting (e.g., full power, 10 pumps ON), and a "keep" setting (e.g., low power, 1 or 2 pumps ON). The threshold signal directs the sequencer 462 to switch between the two.

Within the sequencer is a register holding 2×4-bit data. When the sequencer receives a '0' on "threshold", it outputs one 4-bit data, and when it receives a '1' on "threshold", it outputs the other 4-bit data. In an embodiment, all ten parallel pumps may be employed for maximum power by setting the 4-bit data to be 10 decimal, i.e., all pumps are ON. When the voltage level is approximately reached (and the touch sense array 121 is charged), there is no need to continue pumping at full power. The number of parallel pumps operating may then be throttled. The comparator 452 "signals" the sequencer to switch to the other 4-bit data (which may, for example, contain a '2' decimal setting). Once the charge pump array 330 receives this '2' setting, it will follow suit and power down eight of the ten parallel charge pumps 440a-440n. This saves on power.

It should be noted that all of the pumps cannot be "switched-off" and continue to hold 10V on the touch sense array 121. There is unavoidable leakage and some DC current drain that requires at least one of the ten pumps to be on to sustain the 10V level. It should also be noted that each of the 4-bit data is programmable, e.g., initially there may be 10 charge pumps operating and then 1, or 8 and 2, 5 and 5, etc. For a given application (panel type and size, speed and power requirements, etc.) it is likely that these values may not change once they are set.

In one embodiment, the sequencer 462 may be configured to output individual bits of control (e.g., 4 bits) to provide address signals for a thermometer decoder 463. Although 4 bits of control permit up to 16 thermometer levels to be decode, only 10 are employed.

According to one embodiment, as shown by the dotted lines in FIG. 4, the electronic system 100 may also include a stability compensation capacitor 464, a ripple filter capacitor 466, and a bypass block 468 for permitting the charge pump array 330 to operate on the power supply voltage, vdda.

Once the voltage on an output terminal 442 of the charge pump array 330 has settled to a final voltage, it may supply a high voltage programmable current driver 332, which is configured to charge and discharge the touch sense array 121.

Figure 6:
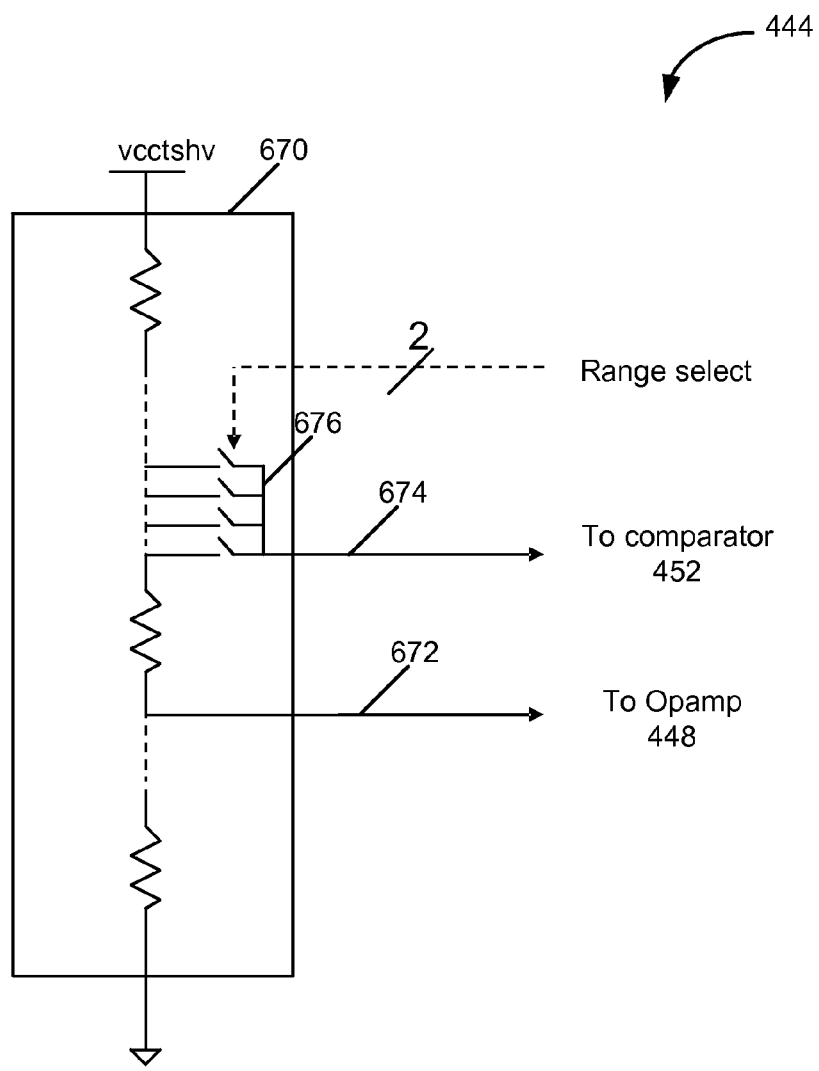
FIG. 6 is a block diagram of one embodiment of the components of a feedback scaler circuit of FIG. 4.

FIG. 6 is a block diagram of one embodiment of the components of the feedback scaler circuit 444. The feedback scaler circuit 444 may be, but is not limited to, a resistor string 670 with a scaling factor, of, for example, about 0.1. A first output 672 of the resistor string 670 may be coupled to the op-amp 448 and includes a first portion of the resistor string 670 connected to ground. A second output 674 of the resistor string 670 may be coupled to the comparator 452 and may be configured to tap a slightly greater amount of resistance of the resistor string 670, therefore providing a slightly higher voltage to the comparator 452 than to the op-amp 448. In one embodiment, a range selection switch 676 fine tunes the voltage presented to the comparator 452 even further at a number of tap-off points of the resistor string 670.

The output 674 to the comparator 452 is set slightly higher than the output 672 to the op-amp 448. This ensures that the threshold signal stays high in a steady state. The op-amp 448 and the comparator 452 may encounter offset voltages. These offsets may cause the comparator threshold signal to NOT go high when required. By setting a voltage at the output 674 to the comparator 452 slightly higher than that at the output 672 to the op-amp 448, the offset problem may be overcome.

The situation is made more complex by having a programmable target voltage. A 15 mV offset at a 10V target voltage shrinks to about 4.5 mV at a 3V target voltage, and the non-trigger problem may re-occur. To counteract this phenomenon, "range" bits may select slightly different tap-off points from the resistor string 670 via the range selection switch 676, depending on the programmed target voltage level.

Figure 7:
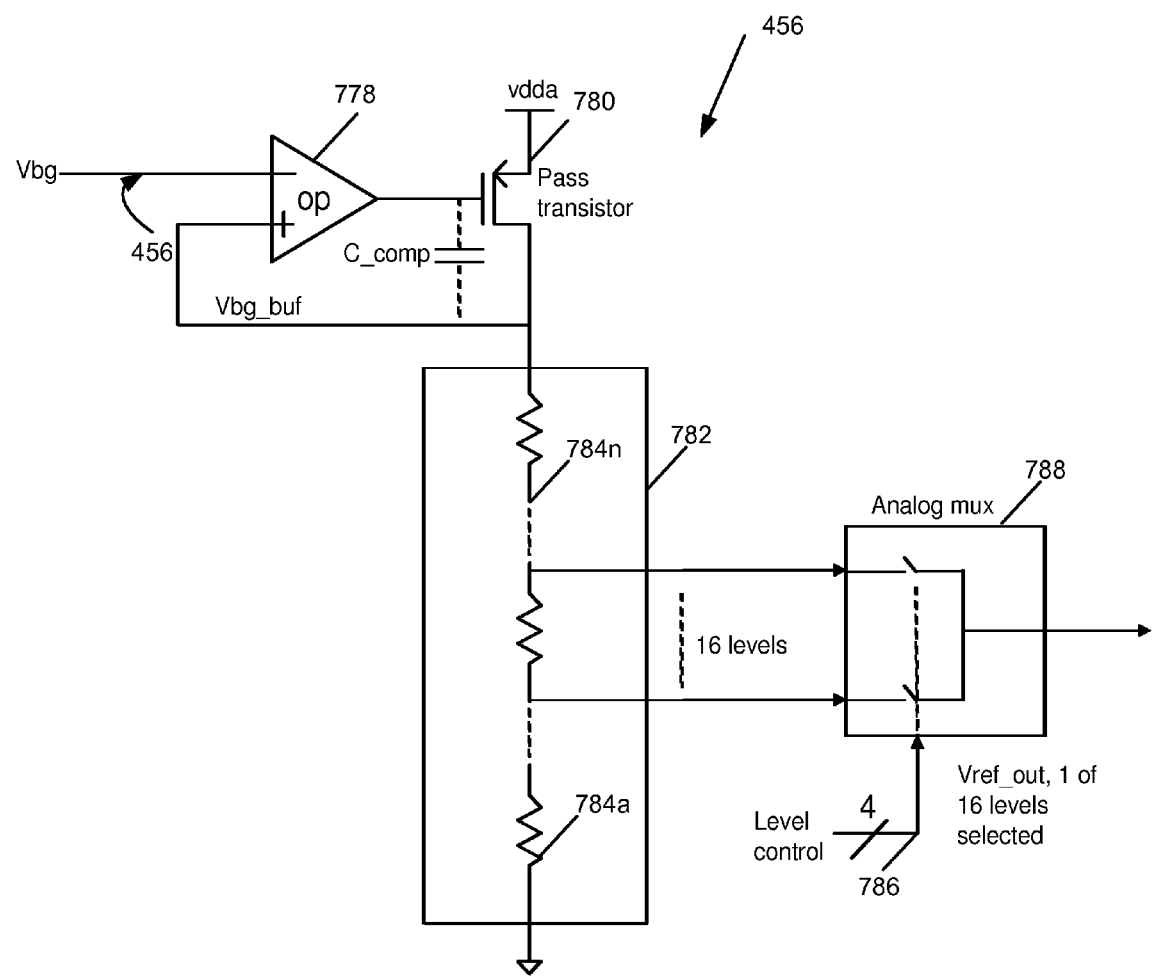
FIG. 7 is a block diagram of one embodiment of the components of a reference generator circuit of FIG. 4.

FIG. 7 is a block diagram of one embodiment of the components of the reference generator circuit 456. The bandgap reference circuit 454, with an output reference voltage, Vbg, is an input to the electronic system 100. A closed-loop op-amp 778 places a replica voltage level, vbg_buf, on a drain output terminal of a pass transistor 780. A resistor ladder 782 provides 16 tap-off points 784a-784n. Each tap-off point (e.g., 784a) provides for a different programmable target voltage level (e.g., in the range of 3V-10V in 0.5V steps). Level control bits 786 select one of the 16 levels via an analog multiplexor 788. An output voltage is then supplied to both the comparator 452 and op-amp 448 coupled to the charge pump array 330. FIG. 8 is a table of thermometer codes implemented by the thermometer decoder 463. Thermometer control may be employed in the implementation of digital-to-analog converters (DACs), where a binary DAC input code is transformed into a thermal equivalent for the purpose of accessing each of the DAC cells. Other implementations of DACs may be used as would be appreciated by one of ordinary skill in the art having the benefit of this disclosure.

Similarly, each of the charge pumps 440a-440n of the charge pump array 330 may be addressed to select a particular combination of charge pumps 440a-440n. An example of a 4-to-16 thermometer code is shown in FIG. 8. In one embodiment, up to decimal 10 are employed. Note that for this condition, d1 up to d10 are all "1", indicating that all 10 parallel charge pumps 440a-440n are to be turned ON. It would also be appreciated by one of ordinary skill in the art that the thermometer decoder 463 may be implemented by standard combinational logic cells.

Figure 9:
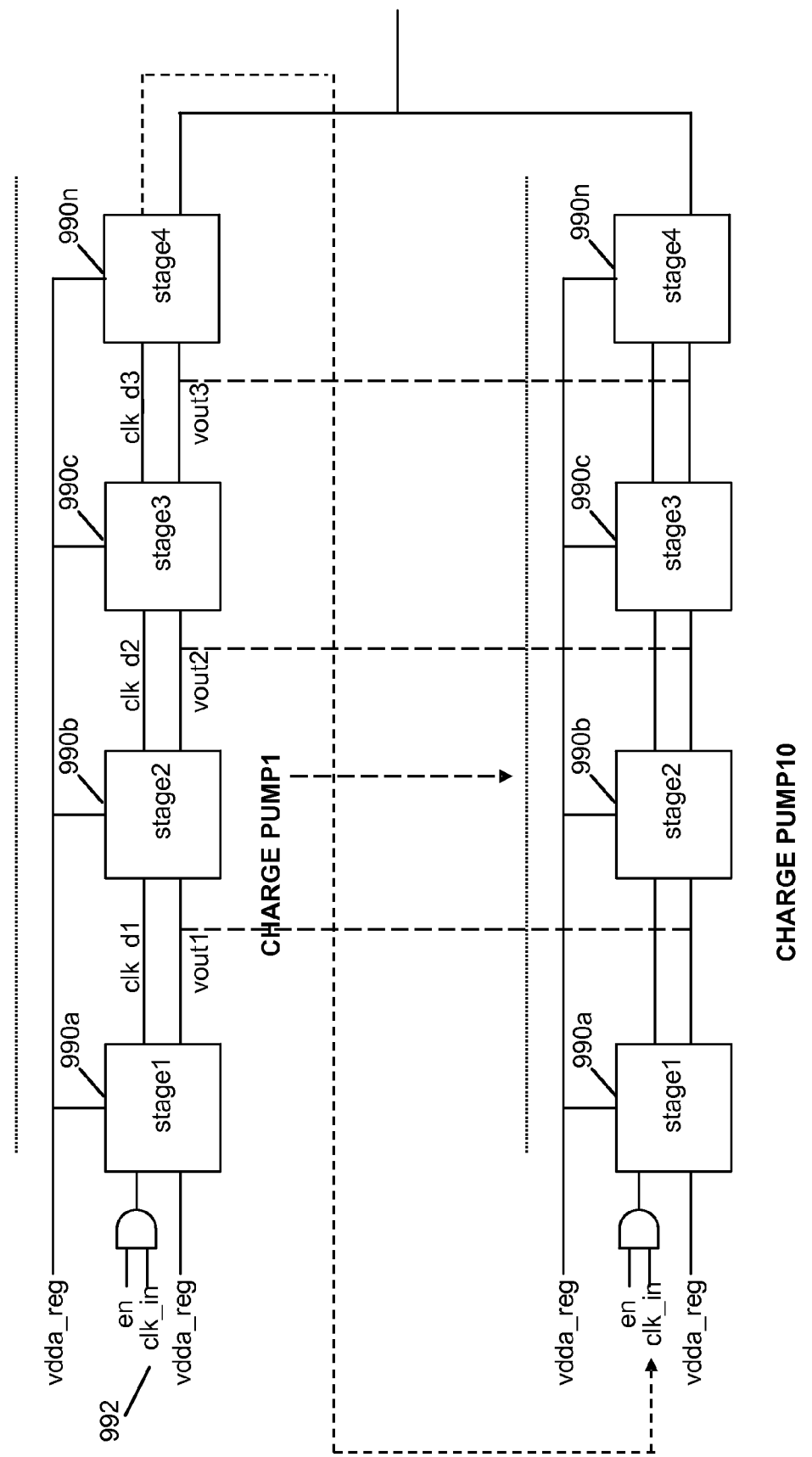
FIG. 9 is a block diagram of one embodiment of the components of the charge pump array of FIG. 4.

FIG. 9 is a block diagram of one embodiment of the components of the charge pump array 330. Each of the charge pumps 440a-440n is a series additive combination of stages 990a-990n (e.g., four), capable, in one embodiment, of reaching 10 V from a 2.6 V supply voltage. As with conventional charge pumps, each of the stages 990a-990n of an individual charge pump (e.g., 440a) is first charged to a supply voltage and then the charged stages 990a-990n are connected in series to produce a total output voltage on the individual charge pump (e.g., 440a) that is greater than the supply voltage. A clock 992 ripples through each stage of the first pump 990a, and continues to the next pump 990b, and so on. The clock ripple scheme reduces electromagnetic interference (EMI) by staggering the clock edges. The signal vdda_reg is the input to the first pump stage 990a in each of the charge pumps 440a-440n. The signal vdda_reg is the supply to the final stage of the clock drivers in each pump stage 990a-990n. The outputs of each of the charge pumps 440a-440n are connected together in parallel. The internal voltage nodes of each pump stage 990a-990n are connected together (i.e., all of the vout1, vout2, vout3 nodes are connected together). The input clock to each of the charge pumps 440a-440n is ANDed with an individual enable signal. When the signal "en" is high, the clock is permitted to pass and the charge pumps 440a-440n operate. When the signal "en" is low, the clock is stopped and all following charge pumps 440a-440n are disabled.

Figure 10:
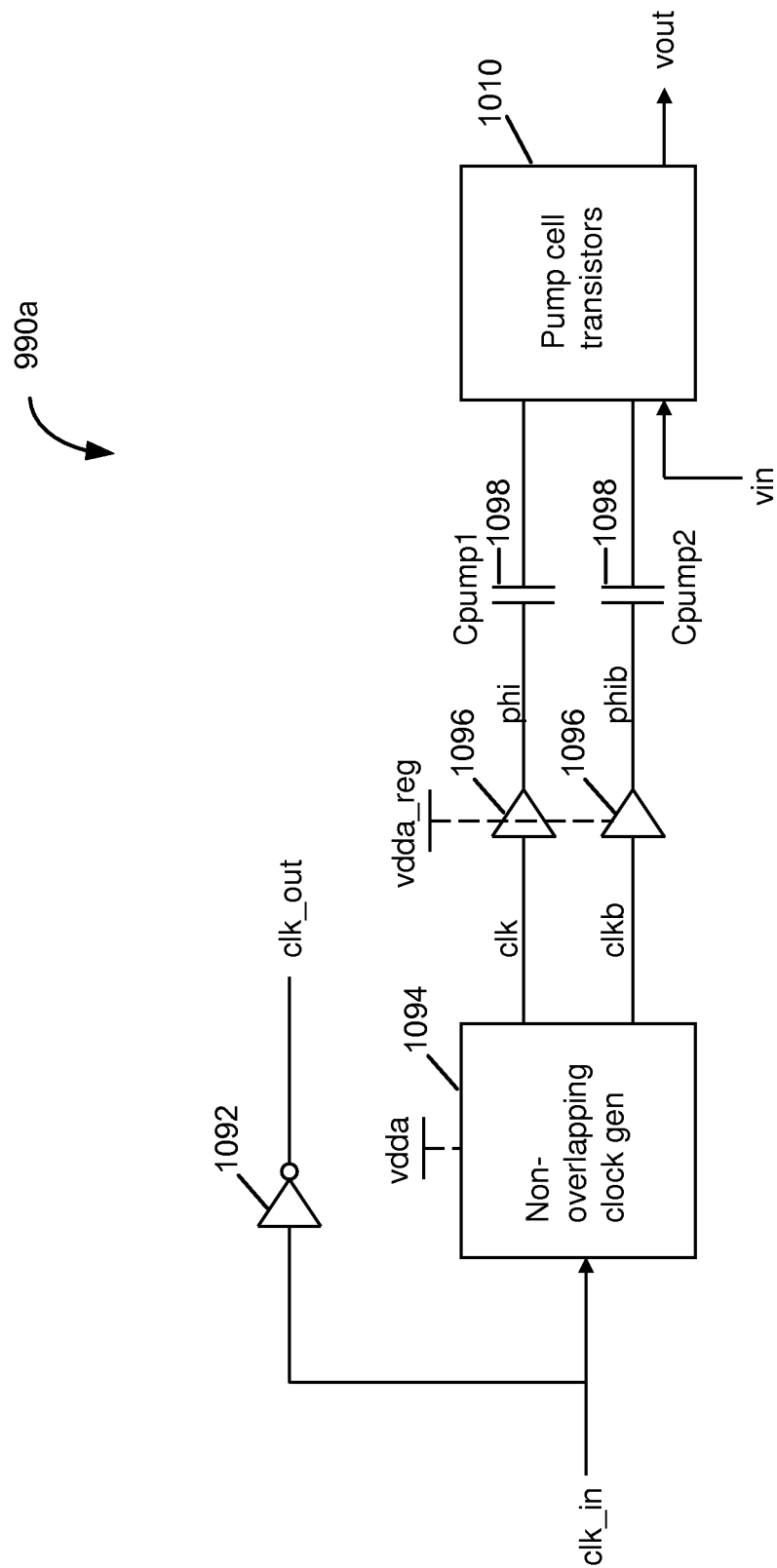
FIG. 10 is a block diagram of one embodiment of the components of a single stage of a sub-charge pump of the charge pump array of FIG. 4.

FIG. 10 is a block diagram one embodiment of the components of a single stage (e.g., 990a) of the charge pumps 440a-440n of the charge pump array 330. An input signal clk_in originates from a previous stage. An inverter 1092 delays the clock, and the signal clk_out is fed to the next stage. The signal clk_in is fed to a non-overlapping clock generator 1094. This produces signals clk and clkb, with vdda as the supply. Buffer cells 1096 operate from the voltage vdda_reg, and produce the signals phi and phib signals. The phi and phib signals are fed to pumping capacitors 1098, which in turn are coupled to pump cell transistors 1010 for transfer of energy by adding the energy to vin. The additive gain through 4 stages is 4*vdda_reg. The voltage on the output terminal 442 of the charge pump array 330 is then vcctshv=vdda+4*vdda_reg, since the voltage vdda is the input to the 1st stage, and each stage adds an additional voltage vdda_reg.

Figure 11:
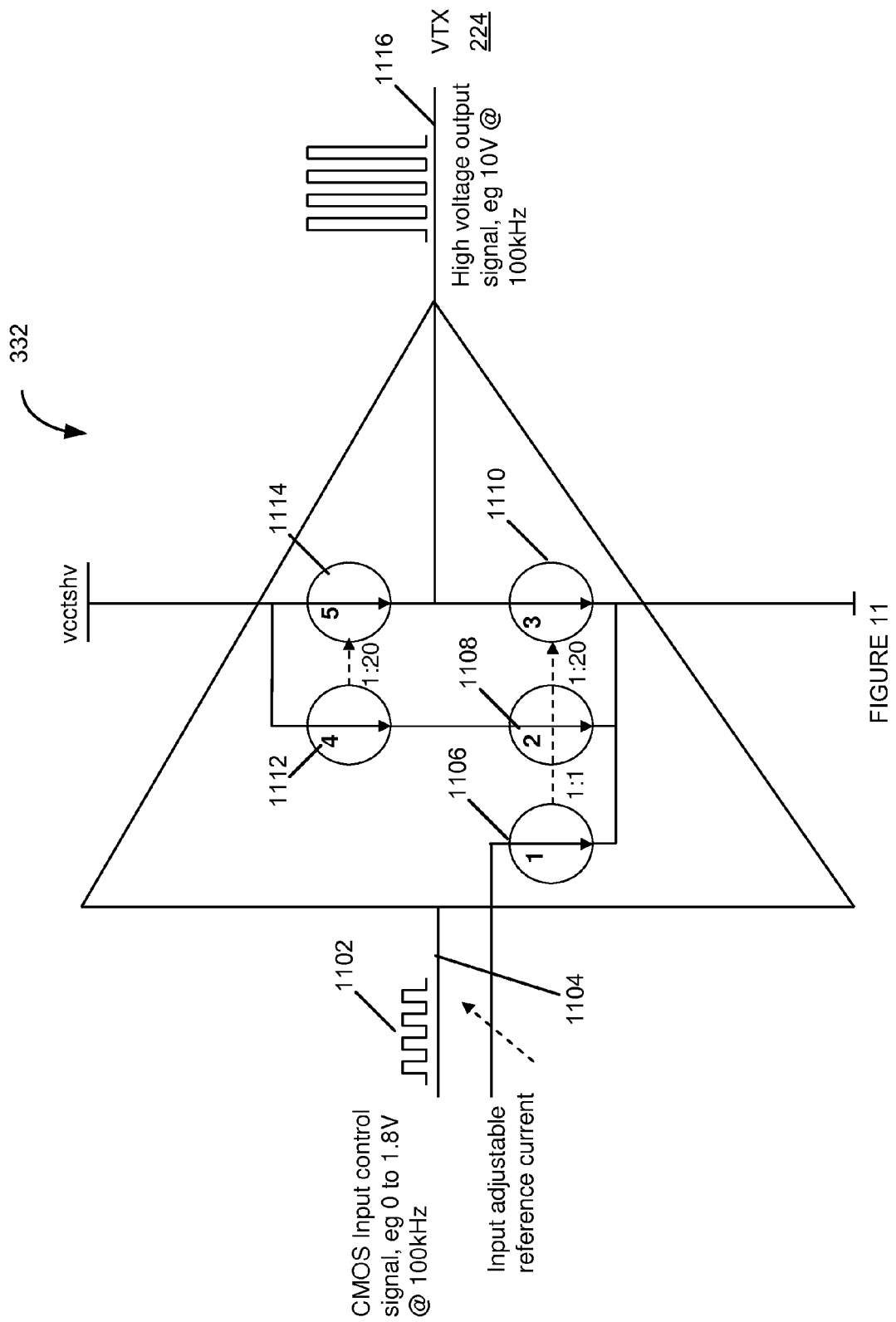
FIG. 11 is a block diagram of one embodiment of the components of the high voltage programmable current driver of FIG. 3.

FIG. 11 is a block diagram of one embodiment of the components of the high voltage programmable current driver 332. The supply to the high voltage programmable current driver 332, vcctshv, is the output of the charge pump array 330 (in addition to ground). An input AC control signal 1102 (e.g., a 100 KHz square wave in the range of 0 V to 1.8 V originating from CMOS logic) is coupled to an input terminal 1104 of the high voltage programmable current driver 332. The high voltage programmable current driver 332 includes an adjustable (and therefore programmable) current sink reference 1106 and a number of current sources/sinks, 1108, 1110, 1112, 1114. The current sink reference 1106 is mirrored 20× to current source 1110. The current source 1110 is an NMOS current sink, and is configured to discharge VTX to 0V when the input control signal 1102 is low. The current source 1114 is OFF in this condition. When control signal 1102 is high, the current source 1110 is OFF. Input current is mirrored 20X to the current source 1114, which is a PMOS current source. The current source 1114 is then configured to charge VTX to the target level (e.g. 10V), so as to produce a high voltage output signal at an output terminal 1116 (e.g., 10 V at 100 KHz).

Referring again to FIG. 3, an equivalent circuit of the high voltage programmable current driver 332 is a current source 318 coupled between supply "vcctshv" and the output terminal 1116 of the high voltage programmable current driver 332, and a current sink 320 coupled between the output terminal 1116 of the high voltage programmable current driver 332 and a common terminal (e.g., ground). When the high voltage programmable current driver 332 is connected to a capacitive load such as between two electrodes of the touch sense array 121 of FIG. 1, this results in an increasing, then decreasing, voltage ramp on one input electrode of the touch sense array 121 (i.e., a triangle wave).

An explanation for the use of a combination current source/sink high voltage current driver 332 is as follows. If the TX signal is substantially a square wave having very sharp edges (high dV/dt), high current spikes result when these edges are applied to a capacitive load. This may lead to saturation effects on the RX side as it may be overwhelmed by inrushing current, and it may create undesired spikes in the power supply, vdda, of the electronic system 100 of FIG. 1. This in turn may negatively impact other system components.

The slopes of the TX signal may be reduced without reducing the frequency of the TX signal. In this context, a high TX frequency may be better than a low frequency, since more of the signal can be produced in a shorter amount of time. Reducing the slope of a square-wave may gradually produce the shape of a triangle wave. Slowing the edges of a square wave signal feeding into a capacitive load is equivalent to limiting the current it can provide. Signal drivers operating in this mode are sometimes referred to as "current starved" drivers. At their core, "current starved" drivers are current sources and sinks with a set current capability. In other words, such a "current starved" driver has current sources/sinks built into its driver stages, limiting its drive capability to the maximum current that the current sinks/source may handle. These limits can be made programmable.

If the output of the charge pump array 330 of FIG. 4 is connected to the current-starved high voltage current driver 332, programmable voltage slopes and programmable voltage levels may be provided. More particularly, a programmable current sink/source connected to a capacitive load, when activated, can drive a current into the capacitive load (i.e., the touch sense array 121) and continues to do so until a target voltage has been reached. The current is produced by the programmable charge pump array 330 which is configured to produce an output current at voltages higher than the supply voltage. Thus, as the voltage builds on the touch sense array 121, the corresponding TX signal ramps up until the maximum voltage achievable with the charge pump array 330 has been reached.

It is worth noting that only the "charge-up" process of the TX signal requires the charge pump array 330 to be active. To "charge down", other circuitry may be used. For example, a current sink can discharge the touch sense array 121 at a controlled (and programmable) rate. As a result, the charge pump array 330 can remain inactive during the charge-down phase and thus not waste any power.

However, in one embodiment, two TX signals may be produced which are complementary in nature: while one TX signal charges up, the other charges down. The one charging up requires the charge pump array 330 to be active, whereas the one charging down employs a switch or a current sink, as described above. Then, during the next phase of the TX signal, the first signal charges down, and the charge pump array 330 now serves the second TX signal so as to charge up. In this scenario, the charge pump array 330 is active all the time, but it serves two TX signals which can be used for creating advanced stimulus signals.

Figure 12:
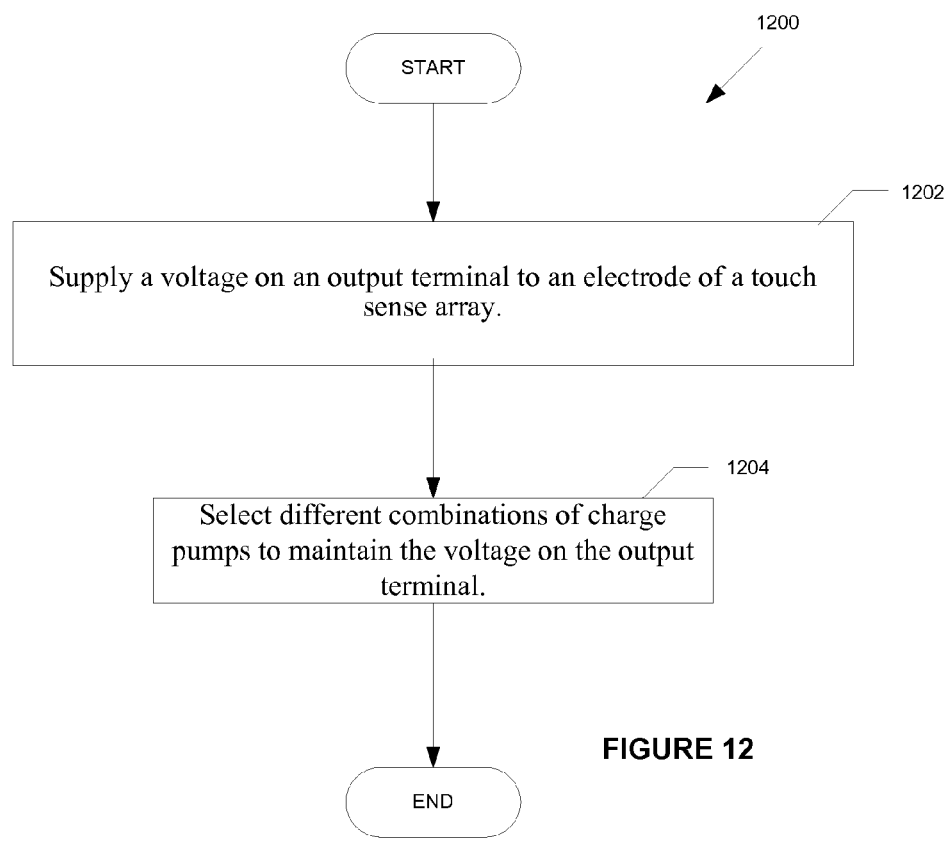
FIG. 12 is a flow diagram of one embodiment of a method for operating the stimulus circuit of FIG. 4.

FIG. 12 is a flow diagram 1200 of one embodiment of a method for operating the circuit of FIG. 4. At block 1202, the charge pump array 330 supplies a supply voltage on an output terminal 442 to the high voltage current driver 332 and thence to an electrode of the touch sense array 121. The first feedback circuit 334 is configured to measure the voltage on the output terminal 442. At block 1204, the first feedback circuit 334 selects different combinations of the charge pumps 440*a*-440*n* to maintain the voltage on the output terminal 442.

FIG. 13 is a flow diagram illustrating one embodiment of selecting different combinations of the charge pumps 440*a*-440*n* of FIG. 12. At block 1302, the first feedback circuit 334 selects a first combination of the charge pumps 440*a*-440*n* when the voltage on the output terminal 442 of the charge pump array 330 is more than a threshold level. At step 1304, the first feedback circuit 334 selects a second combination of the charge pumps 440*a*-440*n* when the voltage on the output terminal 442 is less than the threshold voltage.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A circuit, comprising:
   a driver to supply a voltage on an output terminal to an electrode of a touch sense array;
   a charge pump array coupled to the driver, the charge pump array comprising a plurality of charge pumps to supply an input voltage on a terminal of the charge pump array to the driver; and
   a first feedback circuit coupled to the charge pump array, wherein the first feedback circuit is configured to measure the input voltage and to select a first combination of the plurality of charge pumps when the input voltage is more than a threshold level and to select a second combination of the plurality of charge pumps when the input voltage is less than the threshold voltage, wherein the second combination comprises fewer charge pumps than the first combination.

2. The circuit of claim 1, wherein each of the plurality of charge pumps comprises a plurality of pump stages connected in series and configured to store up to an amount of voltage equal to the input voltage.

3. The circuit of claim 1, wherein the input voltage is programmable.

4. The circuit of claim 1, wherein the first feedback circuit comprises a feedback scaler circuit coupled to the charge pump array, wherein the feedback scaler circuit configured to produce a first voltage proportional to the input voltage.

5. The circuit of claim 4, wherein the first feedback circuit further comprises a comparator coupled to the feedback scaler circuit.

6. The circuit of claim 5, wherein the first feedback circuit further comprises a reference generator configured to produce a reference voltage coupled to the comparator.

7. The circuit of claim 6, wherein the reference generator is configured to select the input voltage of the charge pump array.

8. The circuit of claim 1, further comprising a second feedback coupled to the charge pump array and configured to provide a reference voltage to the charge pump array.

9. A circuit, comprising:
   a multiplexor coupled to a corresponding one of a plurality of input electrodes of a touch sense array, wherein each of the input electrodes is configured to selectively receive a driving current;
   a current driver coupled to at least one input terminal of the multiplexor;
   a charge pump array coupled to the current driver, the charge pump array comprising a plurality of charge pumps to supply an input voltage on a terminal of the charge pump array to the current driver; and
   a first feedback circuit coupled to the charge pump array, wherein the first feedback circuit is configured to measure the input voltage and to select a first combination of the plurality of charge pumps when the input voltage is more than a threshold level and to select a second combination of the plurality of charge pumps when the input voltage is less than the threshold voltage, wherein the second combination comprises fewer charge pumps than the first combination.

10. The circuit of claim 9, wherein the first feedback circuit comprises a feedback scaler circuit coupled to the charge pump array, wherein the feedback scaler circuit is configured to produce a first voltage proportional to the input voltage.

11. The circuit of claim 10, wherein the first feedback circuit further comprises a comparator coupled to the feedback scaler circuit.

12. The circuit of claim 11, wherein the first feedback circuit further comprises a reference generator configured to produce a reference voltage coupled to the comparator.

13. The circuit of claim 9, wherein the current driver comprises:
   a current source coupled between the terminal of the charge pump array and an output terminal of the current driver; and
   a current sink coupled between the output terminal of the current driver and a common terminal.

14. A method for driving a touch sense array, comprising:
   supplying, using a charge pump array comprising a plurality of charge pumps, a voltage on an output terminal to an electrode of a touch sense array; and
   selecting, via a feedback circuit coupled to the charge pump array, a first combination of the plurality of charge pumps when the input voltage is more than a threshold level and to select a second combination of the plurality of charge pumps when the input voltage is less than the threshold voltage, wherein the second combination comprises fewer charge pumps than the first combination.

* * * * *